United States Patent [19]

Farrington et al.

[11] 4,012,563
[45] Mar. 15, 1977

[54] SEALED LITHIUM-SODIUM ELECTROCHEMICAL CELL WITH SODIUM BETA-ALUMINA ELECTROLYTE

[75] Inventors: Gregory C. Farrington, Elnora; Walter L. Roth, Schenectady, both of N.Y.

[73] Assignee: General Electric Company, Schenectady, N.Y.

[22] Filed: Mar. 1, 1976

[21] Appl. No.: 662,945

[52] U.S. Cl. .................. 429/104; 429/218
[51] Int. Cl.² ............................. H01M 4/36
[58] Field of Search ......... 136/6 F, 6 FS, 6 LN, 136/20, 83 R, 100 R, 153; 429/104, 218

[56] References Cited
UNITED STATES PATENTS

| | | | |
|---|---|---|---|
| 3,573,105 | 3/1971 | Weininger et al. | 136/86 A |
| 3,607,417 | 9/1971 | McRae et al. | 136/153 |
| 3,679,480 | 7/1972 | Brown et al. | 136/6 FS |
| 3,713,897 | 1/1973 | Liang | 136/83 R X |
| 3,773,558 | 11/1973 | Charbonnier et al. | 136/6 LN |
| 3,826,685 | 7/1974 | Dubin et al. | 136/20 X |
| 3,879,220 | 4/1975 | Will et al. | 136/83 R |
| 3,897,264 | 7/1975 | Auborn | 136/6 LN |

*Primary Examiner*—Anthony Skapars
*Attorney, Agent, or Firm*—Paul R. Webb, II; Joseph T. Cohen; Jerome C. Squillaro

[57] ABSTRACT

A sealed lithium-sodium electrochemical cell with sodium beta-alumina ion-conductive electrolyte is described which comprises a casing, an anode positioned within the casing, the anode selected from the class consisting of lithium-sodium, lithium-sodium as an amalgam, and lithium-sodium in a non-aqueous electrolyte, a cathode positioned within the casing, the cathode functioning with a lithium-sodium type anode and a solid sodium beta-alumina ion-conductive electrolyte, and a solid sodium beta-alumina ion-conductive electrolyte positioned within the casing between the anode and cathode and in contact with both the anode and cathode

6 Claims, 1 Drawing Figure

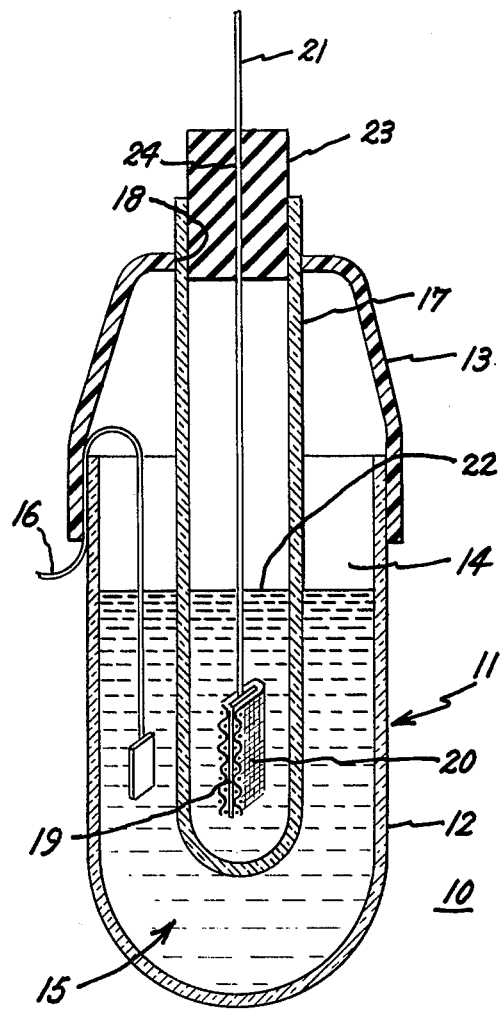

SEALED LITHIUM-SODIUM ELECTROCHEMICAL CELL WITH SODIUM BETA-ALUMINA ELECTROLYTE

This invention relates to sealed cells and, more particularly, to such cells employing a lithium-sodium anode, a cathode, and a solid sodium beta-alumina ion-conductive electrolyte.

Reference is made to copending application Ser. No. 662,946 filed Mar. 1, 1976, in the names of Gregory C. Farrington and Walter L. Roth, and entitled "Sealed Lithium Electrochemical Cell with Sodium Beta-Alumina Electrolyte". This application is assigned to the same assignee as the present application.

Reference is made to U.S. Pat. Nos. 3,793,080; 3,817,790; 3,879,219; 3,879,220; 3,879,221; 3,879,222; 3,879,223; 3,879,224; and 3,899,352. These patents describe sealed primary sodium-halogen cells which include a sodium-type anode, a solid sodium beta-alumina ion-conductive electrolyte, and a cathode. All of these patents are assigned to the same assignee as the present application.

Cross reference is made to allowed copending patent application Ser. Nos. 557,583 and 557,584 filed Mar. 12, 1975, in the names of Walter L. Roth and Gregory C. Farrington and entitled "Sealed Lithium-Reducible Phosphorous Oxyhalide Cell" and "Sealed Lithium-Reducible Sulfur Oxyhalide Cell", respectively. Cross reference is made to allowed copending patent application Ser. No. 559,990 filed Mar. 19, 1975, in the names of Walter L. Roth and Gregory C. Farrington and entitled "Sealed Lithium-Sulfur Monochloride Cell". Cross reference is made to allowed copending patent application Ser. Nos. 571,500 and 571,556 filed Apr. 25, 1975, in the names of Gregory C. Farrington and Walter L. Roth and entitled "Sealed Lithium-Phosphorous Cell" and "Sealed Lithium-Sulfur Cell", respectively. Cross reference is made to allowed copending patent application Ser. No. 572,278 filed Apr. 28, 1975, in the names of Gregory C. Farrington and Walter L. Roth and entitled "Sealed Lithium-Reducible Metal Salt Cell". All of the above copending applications are assigned to the same assignee as the present application.

The above applications and the subject matter thereof are hereby incorporated by reference into the present application.

Cross reference is made to copending application Ser. Nos. 589,135; 589,136; and 589,137; filed June 23, 1975, in the names of Gregory C. Farrington and Walter L. Roth and entitled "Sealed Lithium-Iodine Cell", "Sealed Lithium-Chlorine Cell", and "Sealed Lithium-Bromine Cell", respectively. Cross reference is made to copending patent application Ser. No. 586,220 filed June 12, 1975, in the names of Walter L. Roth and Gregory C. Farrington and entitled "Solid State Electrochemical Cell". Cross reference is made to copending patent application Ser. No. 559,901 filed Mar. 19, 1975, in the names of Walter L. Roth and Gregory C. Farrington and entitled "Sealed Lithium-Reducible Gas Cell". All of the above copending applications are assigned to the same assignee as the present application. The above applications and the subject matter thereof are hereby incorporated by reference into the present application.

In McRae et al., U.S. Pat. No. 3,607,417 entitled "Battery Cell", there is described a battery which employs a lithium or sodium type anode, a porous ceramic barrier including a liquid impervious thin membrane surrounding the anode, an aqueous electrolyte surrounding the barrier, an air cathode surrounding the aqueous electrolyte, an oxidant compartment surrounding the air cathode, and an oxidant of oxygen, sulfur, chlorine, or bromine which is used with lithium or sodium as specified in column 3, lines 14–19 of the patent. The McRae et al. patent does not teach a lithium-sodium type anode, a solid sodium beta-alumina ion-conductive electrolyte, a sealed cell, or the cathode in contact with the solid electrolyte.

In Weininger et al., U.S. Pat. No. 3,573,105, there is described a rechargeable non-aqueous alkali metal-halogen electrochemical cell which includes an alkali metal anode, a halogen cathode, a non-aqueous electrolyte, and an ion-permeable barrier to inhibit migration of halogen to the negative electrode between the electrodes. There is no specific sodium beta-alumina ion-conductive electrolyte between the electrodes which provides absolute separation between the electrodes including their respective liquid electrolytes or solvents excepting alkali ion transport. The electrolyte of the present invention prevents dendrites from piercing the electrolytes as opposed to the Weininger et al. barrier. The electrolyte of the present invention permits cell operation at temperatures above the polymer barrier stability of Weininger et al.

Our present invention is directed to a sealed lithium-sodium electrochemical cell with positive separation of the anode and cathode by a solid sodium beta-alumina ion-conductive electrolyte.

The primary object of our invention is to provide a lithium-sodium electrochemical cell which has high voltage, high energy density, and a near-zero self-discharge rate.

In accordance with one aspect of our invention, a sealed lithium-sodium electrochemical cell with sodium beta-alumina ion-conductive electrolyte employs a lithium-sodium type anode, a compatible cathode, and a solid sodium beta-alumina ion-conductive electrolyte therebetween.

These and various other objects, features and advantages of the invention will be better understood from the following description taken in connection with the accompanying drawing in which:

The single FIGURE is a sectional view of a lithium-sodium electrochemical cell with sodium beta-alumina ion-conductive electrolyte made in accordance with our invention.

In the single FIGURE of the drawing, there is shown generally at 10 a modified sealed lithium-sodium electrochemical cell with sodium beta-alumina ion-conductive electrolyte embodying our invention. An outer casing 11 comprising a lower casing portion 12 of glass and an upper casing portion 13 of polyethylene affixed tightly to the upper end of the lower casing portion 11 thereby provides a chamber 14 for a cathode 15 of a concentrated solution of bromine in a non-aqueous catholyte and a platinum electrode 16. Electrode 16 extends to the exterior of cell 11 through the junction of the lower and upper casing portions 12 and 13. An inner casing 17 in the form of a tube of solid sodium beta-alumina ion-conductive electrolyte is positioned within lower casing portion 12 and immersed partially in cathode 15. An opening 18 is provided in the top of upper casing portion 13 into which tube 17 fits tightly. An anode 19 of lithium-sodium in the form of a lithium-sodium ribbon is pressed onto a nickel mesh 20 which is folded together and attached to the end of a nickel electrical lead 21. An anolyte 22 partially fills tube 17 and is in contact with lithium anode 19. An electrically insulating closure 23 with a hole 24 therethrough is provided at the upper end of tube 17 to seal the initially open end of the tube. Lead 21 extends through the hole 24 in closure 23 to the exterior of cell 10.

We found that we could form a sealed lithium-sodium electrochemical cell with sodium beta-alumina ion-conductive electrolyte by employing a casing having a cathode portion. These two portions are separated by a solid sodium beta-alumina ion-conductive electrolyte which will be further described below. Such a casing may be provided in various configurations.

One such cell employs an outer casing comprising a lower casing portion of glass and an upper casing portion of a plastic such as polyethylene affixed tightly to the upper open end of the lower casing portion thereby providing a chamber for a cathode in a catholyte which functions with a lithium-type anode and a solid lithium beta-alumina ion-conductive electrolyte. An electrode extends from the cathode to the exterior of the cell through the junction of the lower and upper casing portions. An inner casing in the form of a tube of solid sodium beta-alumina ion-conductive electrolyte is positioned within the outer casing and immersed partially in the cathode. An opening is provided in the top of the upper casing portion into which the tube fits tightly. An anode of lithium-sodium in the form of a lithium-sodium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

On page 1 of applicants' application, lines 5–11, it is pointed out that previous patents described sealed primary sodium-halogen cells which include a sodium-type anode, a solid sodium beta-alumina ion-conductive electrolyte, and a cathode. We found previously that we could obtain the desirable conductivity for the operation of cells with lithium-type anodes when we employed a solid lithium-sodium aluminate electrolyte of approximate composition of $LiNaO \cdot 9Al_2O_3$ of which 1.3 to 85.0 weight percent of the total alkali content was lithium. Cross reference is made to our copending applications covering this latter subject matter on page 1, lines 12–24, page 2, lines 1–25, and page 3, lines 1–12.

We found unexpectedly that we could employ lithium-sodium, lithium-sodium as an amalgam, or lithium-sodium in a non-aqueous electrolyte with a solid sodium beta-alumina ion-conductive compatible cathode to produce a desirable electrochemical cell. Such a cell is sealed and has a solid electrolyte between the cathode and the anode. In the above-mentioned copending applications, we employed a solid lithium-sodium aluminate electrolyte, which had a range of 1.3 to 85.0 percent lithium ions in the electrolyte matter with the remainder sodium ions. We were able to employ a lithium-sodium type anode with this solid lithium-sodium aluminate electrolyte and a compatible cathode to produce a desirable cell. The lithium-sodium aluminate electrolyte transported readily lithium ions therethrough without substantially altering the electrolyte's content of sodium ions. We now found unexpectedly that we could employ a lithium-sodium type anode as opposed to the above-mentioned sodium-type anode with a solid sodium beta-alumina ion-conductive electrolyte and a compatible cathode to produce a suitable electrochemical cell. We found further in our present cells that the lithium-sodium type anode could be employed with sodium beta-alumina ion-conductive electrolyte because this electrolyte underwent, during operation of the cell, conversion to a lithium-sodium aluminate electrolyte. Thus, with our present cell, we converted the initial sodium beta-alumina ion-conductive electrolyte to a lithium-sodium aluminate electrolyte during normal cell operation. This, of course, is distinctly different from the teachings of our latter above-referenced copending patent applications in which a lithium-sodium aluminate electrolyte is employed initially with the lithium anode. In our above-referenced patent application Ser. No. 662,946, we employed a lithium-type anode as opposed to the lithium-sodium type anode of the present application. We are able, therefore, to convert the sodium beta-alumina ion-conductive electrolyte during cell operation as opposed to an initial separate exchange operation before cell construction. We find this advantageous in many situations in that this in situ conversion simplifies the manufacture of a lithium-sodium type anode, lithium-sodium aluminate electrolyte, compatible cathode cell in that lithium-sodium aluminate electrolyte is produced during the normal operation of the cell as opposed to its initial manufacture prior to cell assembly. Under some circumstances, however, the separate preparation of lithium-sodium aluminate electrolyte for a cell of the type mentioned above in our copending applications might be desirable in order to control and optimize the properties of the cell.

In the present cell, lithium-sodium, lithium-sodium as an amalgam, or lithium-sodium in a non-aqueous electrolyte or anolyte is employed as the anode. We found that we could employ mixed lithium and sodium in which the lithium was present from 1 weight percent to 99 weight percent with the balance being sodium. When we employ lithium-sodium in non-aqueous electrolytes, the preferred electrolyte or anolyte is 0.1M tetrabutylammonium tetrafluoroborate ($TBABF_4$) in propylene carbonate saturated with $LiClO_4$.

A wide variety of cathodes is suitable which will function with the lithium-sodium anode and the above-described solid electrolyte. Such suitable cathodes include halogens of chlorine, bromine, and iodine; sulfur; phosphorous; a reducible metal salt such as nickel chloride, lead sulfide, silver oxide, cupric fluoride, and lead iodide; a reducible gas such as sulfur dioxide; a reducible sulfur oxyhalide such as thionyl chloride; Fe (III); and oxygen. Each cathode includes an electrode and is contained in a catholyte.

We found that a suitable catholyte for the above cathodes, except for thionyl chloride, Fe (III) and oxygen, was a non-aqueous catholyte of 0.1M tetrabutylammonium fluoroborate in propylene carbonate saturated with $LiClO_4$. A suitable aqueous catholyte for Fe (III) and oxygen is 0.1M nitric acid in water. Thionyl chloride is employed undiluted.

We found that the above cathodes were suitably used in the following manner:

| Cathodes | Manner Used |
| --- | --- |
| Chlorine and sulfur dioxide | Saturated solution in above-described non-aqueous catholyte used with platinum electrode. |
| Bromine and iodine | Concentrated solution in above-described non-aqueous catholyte used with platinum electrode. |
| Sulfur, phosphorous, nickel chloride, lead sulfide, silver oxide, cupric fluoride, and lead iodide | Each was pressed as anhydrous powder on an expanded nickel mesh cathodic electrode in above-described non-aqueous catholyte. |
| Thionyl chloride | Undiluted. |
| Fe (III) | Concentrated solution of $FeCl_3$ in above-described aqueous catholyte used with platinum electrode. |
| Oxygen | Saturated solution in above-described aqueous catholyte used with platinum electrode. |

A cell made in accordance with our invention was formed of an outer casing having a lower casing portion of glass and an upper casing portion of polyethylene adapted to be affixed tightly to the upper open end of the lower casing thereby providing a chamber for the cathode which consisted of a concentrated solution of bromine in a non-aqueous catholyte of 0.1M tetrabutylammonium fluoroborate in propylene carbonate saturated with $LiClO_4$. A platinum electrode was immersed in the cathode and extended to the exterior of the cell through the junction of the lower and upper casing portions. An inner casing in the form of a tube of solid sodium beta-alumina ion-conductive electrolyte was positioned within the outer casing and immersed partially in the cathode by affixing tightly the upper casing portion to the lower casing portion. An opening was provided in the top of the upper casing portion into which the respective tube fitted tightly. An anode of lithium-sodium in the form of a lithium-sodium ribbon was pressed onto a nickel mesh which was folded together and attached to the end of a nickel electrical lead. An anolyte of 0.1M tetrabutylammonium tetrafluoroborate in propylene carbonate saturated with $LiClO_4$ partially filled the tube and was in contact with the lithium anode. An electrically insulating closure with a hole therethrough was provided at the upper end of the tube to seal the initially open end of the tube. The lead extended through the hole in the closure to the exterior of the cell. The resulting device was a sealed lithium electrochemical cell with a sodium beta-alumina ion-conductive electrolyte which was made in accordance with our invention.

Examples of lithium-sodium electrochemical cells with sodium beta-alumina ion-conductive electrolytes made in accordance with our invention are set forth below:

EXAMPLES I–XIV

Fourteen (14) lithium electrochemical cells with sodium beta-alumina ion-conductive electrolytes were made which are cells numbers 1–14. Each of these cells was formed of an outer casing having a lower casing portion of glass and an upper casing portion of polyethylene adapted to be affixed tightly to the upper open end of the lower casing thereby providing the chamber for a cathode in a catholyte with an electroylte, which cathode functions with a lithium-sodium type anode in a solid sodium beta-alumina ion-conductive electrolyte. Each electrode was immersed in the cathode and extended to the exterior of the cell through the junction of the lower and upper casing portions. The catholyte which was employed in cells 1–11 was a non-aqueous catholyte of 0.1M tertrabutylammonium fluoroborate in propylene carbonate saturated with $LiClO_4$. The catholyte for cell 12 was the cathode material thionyl chloride in undiluted form. The catholyte for cells 13 and 14 was an aqueous solution of 0.1M nitric acid in water. The cathodes for cells 1–14 were, respectively, chlorine, bromine, iodine, sulfur, phosphorous, nickel chloride, lead sulfide, silver oxide, cupric fluoride, lead iodide, sulfur dioxide, Fe (III), and oxygen. These cathodes and the manner that they were employed in their respective cells 1–14 are set forth below:

| Cathodes | Manner Used |
| --- | --- |
| Chlorine and sulfur dioxide | Saturated solution in above-described non-aqueous catholyte used with platinum electrode. |
| Bromine and iodine | Concentrated solution in above-described non-aqueous catholyte used with platinum electrode. |
| Sulfur, phosphorous, nickel chloride, lead sulfide, silver oxide, cupric fluoride, and lead iodide. | Each was pressed as anhydrous powder on an expanded nickel mesh cathodic electrode in above-described non-aqueous catholyte. |
| Thionyl chloride | Undiluted. |
| Fe (III) | Concentrated solution of $FeCl_3$ in above-described aqueous catholyte used with platinum electrode. |
| Oxygen | Saturated solution in above-described aqueous catholyte used with platinum electrode. |

An inner casing in the form of a tube of solid sodium beta-alumina ion-conductive electrolyte was positioned within the outer casing of each of cells 1–14 and immersed partially in each of the respective cathodes by affixing tightly the upper casing portion to the lower casing portion. An opening was provided in the tube of each upper casing portion into which the tube fitted tightly. An anode of the same composition was employed for each of the cells 1–14. The anode consisted of 99 weight percent lithium and 1 weight percent sodium, which were mixed together and were pressed onto a nickel mesh which was folded together and attached to the end of a nickel electrical lead. Each anolyte filled partially the respective tube that was in contact with the respective lithium-sodium anode. An electrically insulating closure with a hole therethrough was provided at the upper end of each tube to seal the initially open end of each tube. Each lead extended through the respective hole in the closure to the exterior of each cell. Each of the resulting 14 devices was a sealed lithium-sodium electrochemical cell which was made in accordance with our invention.

Table I, which is set forth below, sets forth for cells 1–14 the cell potential in volts (V) as a function of current in milliamperes (mA). Each cell is identified by number as well as the cathode employed therein. Each of the cells was operated at a temperature of 26° C.

TABLE I

| Current-mA | 1 $Cl_2$ | 2 $Br_2$ | 3 $I_2$ | 4 S | 5 P |
|---|---|---|---|---|---|
| Open Circuit | 3.90 | 4.08 | 3.72 | 2.87 | 2.90 |
| 0.020 | 3.78 | 4.01 | 3.65 | 2.46 | 2.57 |
| 0.040 | 3.67 | 3.92 | 3.55 | 2.17 | 2.37 |
| 0.060 | 3.58 | 3.86 | 3.47 | 1.97 | 2.23 |
| 0.080 | 3.51 | 3.80 | 3.42 | 1.83 | 2.10 |
| 0.100 | 3.45 | 3.76 | 3.37 | 1.72 | 2.00 |
| 0.200 | 3.26 | 3.64 | 3.22 | — | 1.72 |
| 0.400 | 3.01 | 3.46 | 3.02 | — | 1.28 |
| 0.600 | 2.84 | 3.32 | 2.88 | — | 0.93 |
| 0.800 | 2.69 | 3.22 | 2.74 | — | 0.59 |
| 1.0 | 2.56 | 3.14 | 2.56 | — | 0.31 |
| 2.0 | 1.90 | 2.70 | — | — | — |
| 4.0 | 1.25 | 2.21 | — | — | — |
| 6.0 | 0.80 | 1.91 | — | — | — |
| 8.0 | 0.39 | 1.62 | — | — | — |
| 10.0 | 0.00 | 1.39 | — | — | — |

| Current-mA | 6 $NiCl_2$ | 7 PbS | 8 AgO | 9 $CuF_2$ | 10 $PbI_2$ |
|---|---|---|---|---|---|
| Open Circuit | 2.89 | 3.17 | 3.39 | 3.22 | 2.76 |
| 0.020 | 2.40 | 3.10 | 3.31 | 3.17 | 2.24 |
| 0.040 | 2.05 | 3.00 | 3.21 | 3.12 | 1.99 |
| 0.060 | 1.76 | 2.92 | 3.13 | 3.07 | 1.87 |
| 0.080 | 1.53 | 2.84 | 3.07 | 3.02 | 1.82 |
| 0.100 | 1.44 | 2.76 | 2.99 | 2.98 | 1.76 |
| 0.200 | — | 2.61 | 2.87 | 2.84 | 1.54 |
| 0.400 | — | 2.32 | 2.61 | 2.61 | 1.18 |
| 0.600 | — | 2.11 | 2.44 | 2.44 | 0.96 |
| 0.800 | — | 1.94 | 2.30 | 2.29 | 0.77 |
| 1.0 | — | 1.80 | 2.18 | 2.17 | 0.60 |
| 2.0 | — | — | 1.69 | 1.59 | — |
| 4.0 | — | — | 1.00 | 0.60 | — |
| 6.0 | — | — | 0.66 | — | — |
| 8.0 | — | — | 0.22 | — | — |
| 10.0 | — | — | — | — | — |

| Current-mA | 11 $SO_2$ | 12 $SOCl_2$ | 13 Fe(III) | 14 $O_2$ |
|---|---|---|---|---|
| Open Circuit | 3.20 | 3.90 | 3.12 | 3.02 |
| 0.020 | 2.87 | 3.51 | 2.83 | 2.88 |
| 0.040 | 2.58 | 3.28 | 2.78 | 2.74 |
| 0.060 | 2.41 | 3.11 | 2.75 | 2.63 |
| 0.080 | 2.29 | 2.95 | 2.46 | 2.53 |
| 0.100 | 2.21 | 2.81 | 2.36 | 2.45 |
| 0.200 | — | 2.02 | 2.13 | 2.31 |
| 0.400 | — | 1.17 | 1.97 | 2.00 |
| 0.600 | — | 0.49 | 1.77 | 1.83 |
| 0.800 | — | — | 1.48 | 1.69 |
| 1.0 | — | — | 1.32 | 1.57 |
| 2.0 | — | — | 0.71 | 1.06 |
| 4.0 | — | — | 0.22 | 0.53 |
| 6.0 | — | — | — | 0.20 |
| 8.0 | — | — | — | — |
| 10.0 | — | — | — | — |

EXAMPLES XV–XXIII

Nine lithium-sodium electrochemical cells were made which were cell numbers 15–23. Each of these cells was formed as described above in examples I–XIV. In each of the cells 15–23, the inner casing was in the form of a tube of solid sodium beta-alumina ion-conductive electrolyte. An anode of the same composition was employed for each of the cells 15–23. The anode consisted of 1 weight percent lithium and 99 weight percent sodium, which were mixed together and were pressed onto a nickel mesh which was folded together and attached to the end of the nickel electrical lead, as described above in previous examples I–XIV. Each of the resulting devices was a sealed lithium-sodium electrochemical cell which was made in accordance with our invention.

Table II, which is set forth below, sets forth for cells 15–23 the cell potential in volts (V) as a function of current in milliamperes (mA). Each cell is identified by number as well as by the cathode employed therein. Each of the cells was operated at a temperature of 26° C.

TABLE II

| Current-mA | 15 $Br_2$ | 16 $I_2$ | 17 S | 18 P | 19 $NiCl_2$ |
|---|---|---|---|---|---|
| Open Circuit | 3.90 | 3.60 | 2.83 | 2.81 | 2.81 |
| 0.020 | 3.82 | 3.50 | 2.42 | 2.44 | 2.38 |
| 0.040 | 3.70 | 3.37 | 2.16 | 2.20 | 2.05 |
| 0.060 | 3.62 | 3.28 | 1.92 | 2.02 | 1.72 |
| 0.080 | 3.56 | 3.21 | 1.75 | 1.88 | 1.48 |
| 0.100 | 3.50 | 3.15 | 1.63 | 1.74 | 1.27 |
| 0.200 | 3.36 | 2.98 | — | — | — |
| 0.400 | 3.13 | 2.74 | — | — | — |
| 0.600 | 2.93 | 2.55 | — | — | — |
| 0.800 | 2.76 | 2.37 | — | — | — |
| 1.0 | 2.62 | 2.19 | — | — | — |
| 2.0 | 2.17 | — | — | — | — |
| 4.0 | 1.38 | — | — | — | — |
| 6.0 | 1.01 | — | — | — | — |
| 8.0 | 0.75 | — | — | — | — |
| 10.0 | 0.50 | — | — | — | — |

| Current-mA | 20 PbS | 21 AgO | 22 $CuF_2$ | 23 $PbI_2$ |
|---|---|---|---|---|
| Open Circuit | 3.02 | 3.26 | 3.17 | 2.67 |
| 0.020 | 2.92 | 3.17 | 3.08 | 2.13 |
| 0.040 | 2.80 | 3.03 | 2.99 | 1.86 |
| 0.060 | 2.70 | 2.93 | 2.91 | 1.77 |
| 0.080 | 2.61 | 2.82 | 2.84 | 1.70 |
| 0.100 | 2.52 | 2.73 | 2.79 | 1.62 |
| 0.200 | 2.34 | 2.67 | 2.63 | — |
| 0.400 | 2.03 | 2.34 | 2.37 | — |
| 0.600 | 1.78 | 2.11 | 2.16 | — |
| 0.800 | 1.58 | 1.90 | 1.98 | — |
| 1.0 | 1.43 | 1.71 | 1.82 | — |
| 2.0 | — | 1.16 | 1.22 | — |
| 4.0 | — | 0.18 | 0.22 | — |
| 6.0 | — | — | — | — |
| 8.0 | — | — | — | — |
| 10.0 | — | — | — | — |

While other modifications of the invention and variations thereof which may be employed within the scope of the invention have not been described, the invention is intended to include such as may be embraced within the following claims:

What we claim as new and desire to secure by Letters Patent of the United States:

1. A sealed lithium-sodium electrochemical cell comprises a casing, an anode positioned within the casing, the anode selected from the class consisting of lithium-sodium, lithium-sodium as an amalgam, and lithium-sodium in a non-aqueous electrolyte, the anode consisting of from 1.0 weight percent to 99.0 weight percent lithium and the balance being sodium, a cathode positioned within the casing, the cathode functioning with an anode selected from the class consisting of lithium-sodium, lithium-sodium as an amalgam, and lithium-sodium in a non-aqueous electrolyte, and a solid sodium beta-alumina ion-conductive electrolyte, and a solid sodium beta-alumina ion-conductive electrolyte positioned within the casing between the anode and cathode and in contact with both the anode and cathode.

2. A sealed lithium-sodium electrochemical cell as in claim 1, in which the anode consists of 99 weight percent lithium and 1 weight percent sodium.

3. A sealed lithium-sodium electrochemical cell as in claim 1, in which the anode consists of 1 weight percent lithium and 99 weight percent sodium.

4. A sealed lithium-sodium electrochemical cell as in claim 1, in which the cathode consists of a halogen selected from the class consisting of chlorine, bromine, an and iodine in a non-aqueous catholyte.

5. A sealed lithium electrochemical cell as in claim 1, in which the cathode consists of a reducible metal salt in a non-aqueous catholyte.

6. A sealed lithium electrochemical cell as in claim 1, in which the cathode consists of a reducible gas in a non-aqueous catholyte.

* * * * *